(No Model.)

A. E. SPANGLER.
VEHICLE TIRE.

No. 504,819.

Patented Sept. 12, 1893.

WITNESSES:
H. A. Carhart,
Chas. Marvin.

INVENTOR
Albert E. Spangler
BY
Smith & Denison
ATTORNEYS.

UNITED STATES PATENT OFFICE.

ALBERT E. SPANGLER, OF SYRACUSE, NEW YORK.

VEHICLE-TIRE.

SPECIFICATION forming part of Letters Patent No. 504,819, dated September 12, 1893.

Application filed May 15, 1893. Serial No. 474,365. (No model.)

*To all whom it may concern:*

Be it known that I, ALBERT E. SPANGLER, of Syracuse, in the county of Onondaga, in the State of New York, have invented new and useful Improvements in Vehicle-Tires, of which the following, taken in connection with the accompanying drawings, is a full, clear, and exact description.

This invention relates to vehicle wheels and the tires therefor and more particularly to the means for securing the tire upon the rim of the wheel.

My object is to produce a tire for a vehicle wheel which may be locked into the rim automatically and securely held by the inflation of the pneumatic tube or sack. And to that end my invention consists in the several new and novel combination of parts hereinafter described and which are specifically set forth in the claims hereunto annexed.

It is constructed as follows reference being had to the accompanying drawings, in which—

Figure 1:
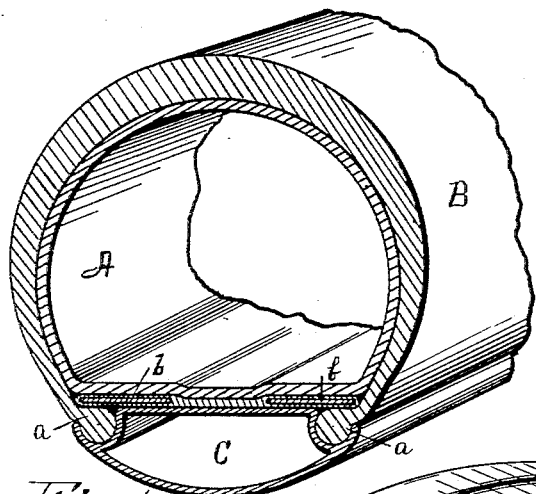
Figure 2:
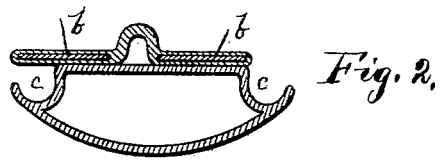
Figure 3:
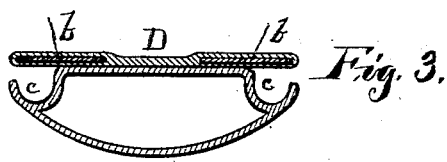
Figure 4:
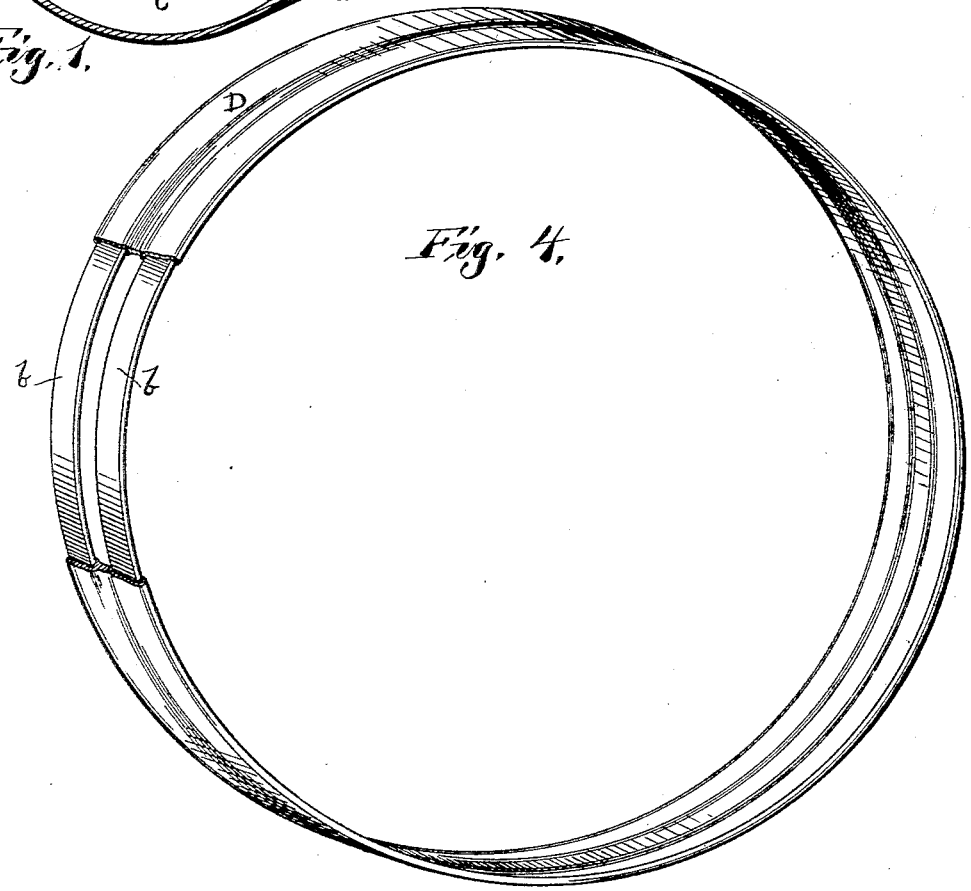

Figure 1, is a transverse section of the rim and tire complete, inflated. Fig. 2, is a cross section of the rim and plate or bands showing said plates or bands mounted in a connecting web in the position they occupy when the shoe is being put onto the rim. Fig. 3, is a similar view showing the position of the continuous plates or bands after the shoe is on and before the pneumatic sack is inflated. Fig. 4, is an isometrical view of the continuous plates or bands mounted within the flexible web, detached, and showing a portion of said web broken away.

A, is the pneumatic sack of any ordinary construction.

B, is the outer shoe or casing inclosing the sack and having its lateral edges —a— enlarged substantially as shown.

C, is the rim of the wheel having its outer face adapted to receive the substantially parallel continuous metallic plates or bands —b— and having its outer edges constructed to form pockets —c— for the reception of the edges —a— of the tire. The parallel plates or bands —b— are continuous and so mounted upon the upper or outer face of the rim —C— as to allow them to move laterally so as to partially inclose the mouth of the pocket —c— in the rim after the enlarged ends of the shoe have been inserted.

D, is a piece of rubber webbing or other preferably elastic material having the continuous plates or bands —b— secured therein in any ordinary manner, preferably, however, vulcanized therein, said bands being adapted to be forced apart by the elasticity of the webbing thereby allowing the plates to partially inclose the top opening of the pockets —c—.

It will be observed that when the pneumatic sack is inflated that portion of the webbing between the plates will assume the position shown in Figs. 1 and 3, thereby securely forcing the plates over the top of the pocket and preventing the lateral edges of the shoe from being withdrawn.

It will be observed that when it is desired to remove the shoe, the pneumatic sack may be deflated and the plate pushed inwardly until it assumes the position shown in Fig. 2 when the lateral edges may be withdrawn from the pockets, and returned again to their position and the sack again reinflated.

I claim—

1. In a tire, continuous flat bands having a resilient connection between them and adapted to be contracted or expanded in the plane of their faces.

2. A pneumatic tire comprising a sack, a shoe having enlarged edges, a rim having pockets for receiving said edges, a web having continuous plates or bands secured within or to its lateral edges, as set forth.

3. A pneumatic tire comprising a shoe having thickened edges, a rim concaved to receive said edges and a lock comprising continuous flat bands and a flexible connection between them, in combination with a pneumatic sack within said shoe, adapted to engage with said connection and spread said bands apart in the plane of their faces.

In witness whereof I have hereunto set my hand this 28th day of April, 1893.

A. E. SPANGLER.

In presence of—
C. W. SMITH,
HOWARD P. DENISON.